Nov. 22, 1966    M. NEWTON    3,286,402
INJECTION HATCHET
Filed Feb. 25, 1965
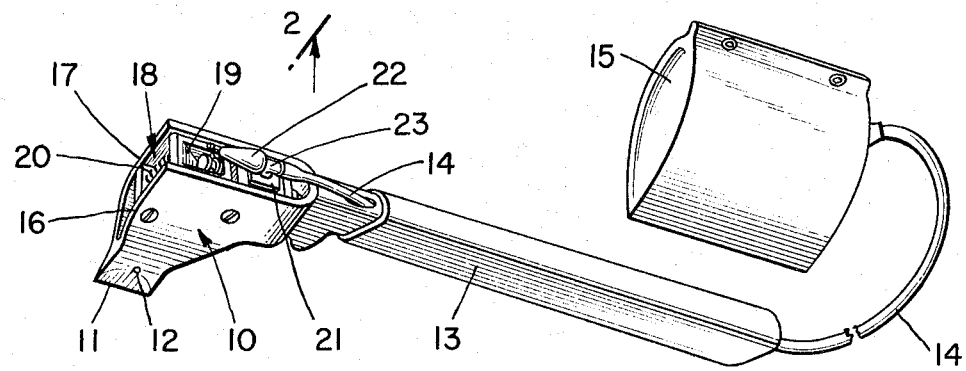
Fig.1.
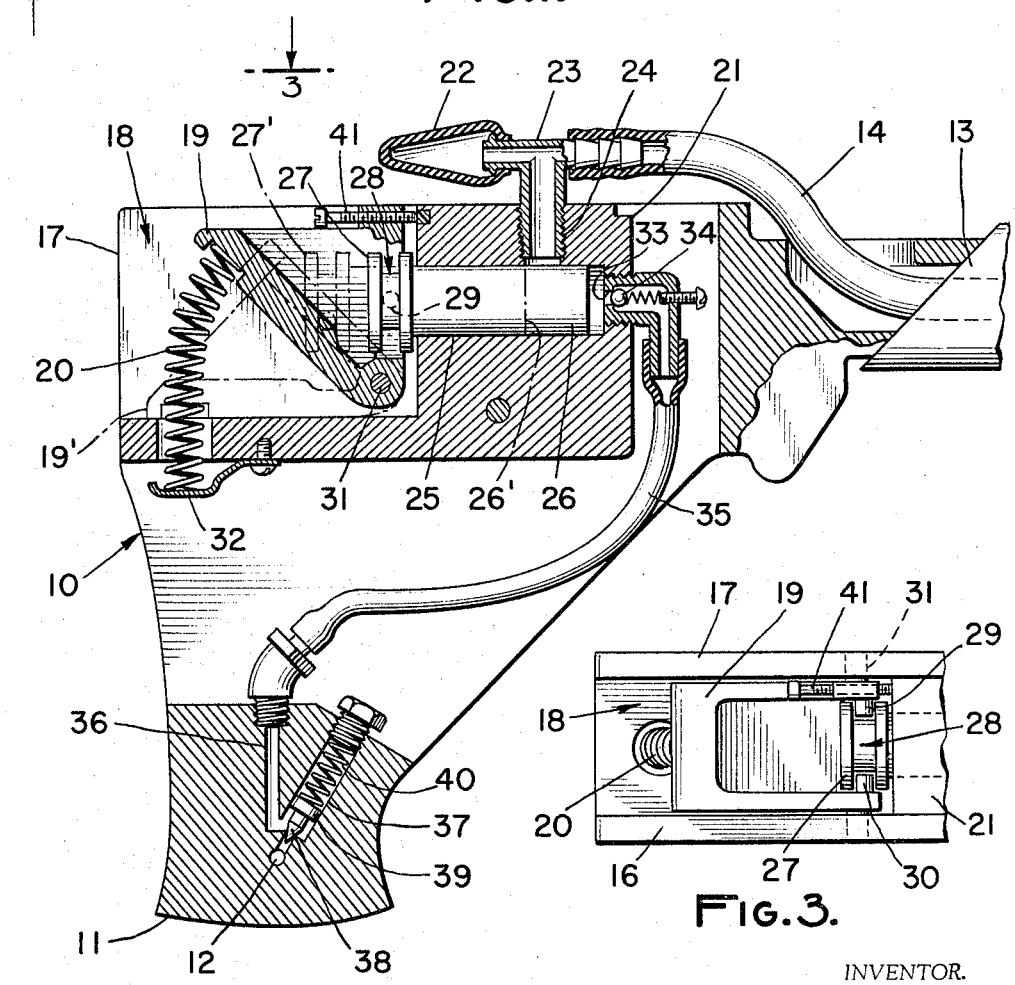
Fig.2.
Fig.3.
INVENTOR.
MICHAEL NEWTON
BY
Elliott & Pastoriza
ATTORNEYS

United States Patent Office 3,286,402
Patented Nov. 22, 1966

3,286,402
INJECTION HATCHET
Michael Newton, % Forest Research Lab., Oregon State Univ., Corvallis, Oreg.
Filed Feb. 25, 1965, Ser. No. 435,259
9 Claims. (Cl. 47—57.5)

This invention relates generally to forestry devices and more particularly, to a novel injection hatchet for injecting chemicals into trees.

In forestry work, it is common practice to inject trees with different chemicals. In some instances, it is desired to kill the tree and towards this end a toxic chemical is injected into the tree trunk. In other instances, it may be desirable to treat the tree for a disease in which case a remedial type chemical such as a fungicide or an insecticide may be injected into the tree.

Instruments provided for the foregoing purposes have heretofore taken the form of a spear or axe incorporating, usually in the handle, a fluid reservoir from which a fluid chemical is passed to suitable orifices in the cutting blade when the tree is pierced or cut. These devices, such as the axe, often operate on an inertia principle wherein the sudden impact of the axe striking the tree triggers a mechanism by inertia to inject the fluid. With such arrangements as have been proposed however, the fluid chemical is not always injected properly into the tree trunk. The primary difficulty is the fact that the fluid is expelled directly in response to the impact by the inertia operated device. Therefore, the fluid is often ejected from the outlet orifice in the axe prior to the time that the axe is completely imbedded within the trunk. Moreover, the amount of fluid ejected from the axe into the tree will often times depend upon the striking force so that uniformity of injection is difficult to realize.

A further problem encountered with presently available injection devices results from the provision of a reservoir for the fluid chemical in the device itself. Such a reservoir is relatively large and thus results in a fairly heavy and bulky axe structure. The user must thus lift the weight of the entire reservoir along with the axe when effecting an injection operation.

Finally, after the axe is removed from the tree preparatory to effecting a further cut, some of the chemical fluid may drip from the outlet orifice. In instances in which this fluid is employed for killing trees, it can be very corrosive and dangerous to the user.

With all of the foregoing considerations in mind, it is a primary object of this invention to provide a vastly improved injection device in which the above problems are overcome.

More particularly, it is an object to provide an injection device which is so designed that injection of chemical fluid into the tree can only occur after the cutting blade of the device has been completely embedded in the tree trunk.

Another object is to provide an injection device which is inertia operated and yet in which a positive and uniform injection of a desired quantity of chemical fluid into the tree can be effected wholly independently of the striking force of the device.

Still another object is to provide an injection device which is relatively light and portable, and yet may be used a number of times without necessitating the provision of a reservoir incorporated in the device itself.

Another object is to provide an injection device incorporating means for preventing any dripping of toxicants or other chemicals from the outlet orifices in the device when not in use.

Yet another object of this invention is to provide an injection device which will effect injection completely automatically and yet in which expelling or ejection of chemical fluid from the device can also be carried out manually without having to imbed the device in a tree.

Briefly, these and many other objects and advantages of this invention are attained by providing the injection device in the form of a hatchet which may readily be carried on a person and operated with one hand. The hatchet includes a head structure defining a cutting edge having suitable outlet orifices and incorporating within the head structure a pump means for metering a desired quantity of chemical fluid to the outlet orifices after the cutting edge has been imbedded in a tree. Towards this end there is provided an inertia means in the head which functions to draw a given quantity of fluid into the pump means upon impact of the hatchet with a tree. No chemical fluid, however, is expelled from the outlet orifice on the cutting edge during this portion of the operation.

Also provided in the head is an actuating means adapted to operate the pump means to expel the fluid drawn into the pump, this actuating means being only operable after impact so that the fluid can only be expelled from the outlet orifices after the inertia means has effected the drawing of fluid into the pump means. As a consequence, it is not possible to eject any fluid into the tree until after the cutting edge has been fully imbedded.

Rather than any type of reservoir in the hatchet structure itself, there is provided an auxiliary reservoir container, preferably in the form of a flexible suitably lined bag structure readily carried by the user. A flexible hose connects from the reservoir bag structure axially through the handle of the hatchet to the pump means and serves to provide the chemical fluid to the pump means. With this arrangement, the hatchet structure itself may be made relatively small and compact and is thus easy to use without constant refilling.

The head structure also incorporates means to prevent dripping of any of the chemical fluid when the hatchet is not in use and is designed to allow ready access to the inertia means and pump structure so that the pumping action can be effected manually to ready the device for operation and insure that it is operating correctly.

A better understanding of the invention will be had by now referring to a preferred embodiment thereof as illustrated in the accompanying drawings, in which:

FIGURE 1 is a perspective view of the injection hatchet of this invention;

FIGURE 2 is a greatly enlarged view partly in cross-section taken in the direction of the arrows 2—2 of FIGURE 1; and, FIGURE 3 is a top fragmentary plan view of the hatchet looking in the direction of the arrow 3 of FIGURE 2.

Referring first to FIGURE 1, the injection hatchet includes a head structure 10 having a cutting edge 11 and a fluid outlet orifice 12 disposed relatively closely to the cutting edge. A handle 13 is secured to the head structure and incorporates an inlet fluid hose 14 passing axially through the handle to connect to the head 10 at one end and to a portable fluid reservoir 15 at its other end. The reservoir 15 is preferably formed of flexible material and arranged to be carried by a person using the hatchet, the fluid inlet hose 14 being of a sufficient length to permit free swinging movement of the hatchet. The hose 14 is preferably of nylon and is sealingly connected to the reservoir 15.

The head structure includes first and second parallel walls 16 and 17 defining an open top channel 18 therebetween. Disposed within the channel and readily accessible from the top thereof are an inertia means in the form of a weighted member 19 and a cooperating return spring 20. The inertia member 19 and spring 20 function to operate a pump means 21. The pump means 21 receives fluid from the inlet hose 14 by way of a pressure equalizer structure 22 connected to an inlet T fixture 23.

With particular reference now to FIGURE 2, it will be noted that the T structure 23 threads into an inlet port 24 within the pump means 21. The pump means 21 is in the form of a metallic block having an internal bore 25 defining a cylinder. The inlet port 24 passes into a side of the cylinder at a point spaced from the right hand end of the cylinder. A plunger 26, in turn, is disposed in the cylinder 25 for back and forth movements between first and second positions.

As shown in both FIGURES 2 and 3, the left end of the plunger 26 terminates in a head 27 including an annular groove 28. This annular groove receives a pair of diametrically opposite pins 29 and 30 secured to the inertia member 19. The inertia member 19 is pivoted at its lower portion as at 31 for swinging movement between the solid and dotted line positions shown, the latter dotted line position being indicated at 19'. This swinging movement about the pivot 31 will result in the pins 29 and 30 withdrawing the plunger 26 from the cylindrical bore 25. The return spring 20 described in FIGURE 1 is supported at its lower end by a suitable bracket 32 fixed to the head structure.

With particular reference to FIGURE 2, the right hand end of the cylindrical bore 25 receives a suitable fitting defining an outlet port 33 incorporating a check valve 34. From the check valve a flexible tubing 35 extends to an outlet passage 36 adjacent the cutting edge 11 of the hatchet. An additional check valve structure is positioned adjacent to the outlet orifice 12 and includes a bore 37 and needle type valve structure 38 secured to a piston member 39 movable within the bore 37. A spring 40 normally biases the piston 39 and thus the needle valve head 38 into the outlet orifice 12 at its inner end to close off the outlet orifice. However, when fluid under pressure is received in the outlet passage 36, this pressure will act on the piston 39 to raise the needle valve 38 and permit the fluid to pass out the outlet orifice 12.

The hatchet assembly is completed by a suitable means for adjusting the stroke of the plunger 26. Thus, referring to both FIGURES 2 and 3, there is provided an adjustable screw 41 passing through a portion of the inertia member 19 to bear against the left edge of the cylindrical block forming the pump means 21. By adjusting the threaded extent of the screw 41, the position of the inertia member and thus the plunger 26 within the bore 25 may be adjusted.

With the foregoing description of the various components in mind, the operation of the injection hatchet will now be described. With the reservoir 15 of FIGURE 1 secured to the belt of the operator or otherwise appropriately carried by the operator, and fluid chemical contained in the reservoir available for use, the operator will simply swing the hatchet by means of the handle 13 in a conventional manner to imbed the cutting edge 11 in a tree.

The deceleration of the head structure 10 on impact will result in the inertia member 19 swinging downwardly, as viewed in FIGURE 2, to the dotted line position 19' thereby compressing the return spring 20. This swinging movement of the inertia member withdraws the plunger 26 to the position illustrated in dotted lines so that a receiving chamber between the end of the plunger 26 and the outlet port 33 is defined within the cylindrical bore 25. The check valve 34 will close because of the reduced pressure as a consequence of leftward movement of the plunger 26. The greatly reduced pressure in the chamber between the end of the plunger 26 and the outlet port 33 will then result in drawing of fluid in through the inlet hose 14 and inlet port 24 to this chamber.

In respect to the foregoing, it will be noted that in the dotted line position, the end of the plunger 26' has passed the inlet port 24 so that the created reduced pressure in the chamber portion of the bore will result in fluid rapidly flowing into the chamber area between the end of the plunger and the outlet port 33. The flexible pressure equalizer in the form of the bulb 22 on the T fitting 23 will accommodate the sudden pressure surges resulting from the exposure of the inlet port 24 so that fairly uniform inward flow into the cylindrical bore will occur.

In further respect to the foregoing, the structure is designed so that even for minimum impacts or blows of the hatchet against a tree, the inertia member 19 will swing down to the dotted line position 19' where it is checked against further movement by the base of the head structure. Thus, the plunger 26 will always be withdrawn the same amount as defined by the first and second positions of the inertia member 19. Therefore, there will always be provided a metered or constant amount of fluid independently of the striking force, it being assumed, of course, that the striking force is at least sufficient to penetrate the tree trunk.

The return spring 20 will then move the inertia member 19 back towards its solid line position. However, it will be clear that this movement cannot possibly result until after the hatchet blade has been imbedded in the tree or, stated differently, after complete deceleration of the blade has occurred. As the inertia member 19 is returned to its solid line position, the pins 29 and 30 (FIGURE 3) will urge the plunger 26 to the right as viewed in FIGURE 2 past the inlet port 24 thereby closing off this port and thus, by positive displacement, forcing the fluid drawn into the cylinder past the check valve 34 into the outlet hose 35 and outlet passage 36.

The pressure of the fluid passing down the outlet passage 36, as described heretofore, is sufficient to raise the additional check valve piston 39 so that the fluid will then be injected into the tree from the outlet orifice 12. While only one outlet orifice 12 is visible in the drawings, it will be understood that additional outlet orifices all connecting to the common passage receiving needle valve 38 may be provided, such as on the opposite side of the cutting edge 11.

After the fluid has been injected into the tree which, as stated, can only occur after the blade has been imbedded in the tree, the operator will remove the hatchet head and effect another cutting of the tree at a suitably spaced point in accordance with the particular treatment being carried out. There is no need to make any adjustments during this operation, the subsequent striking of the tree again causing the inertia member 19 to move to its dotted line position and thus draw another metered amount of fluid into the cylindrical bore 25. Again, after a complete deceleration of the hatchet head structure, the return spring 20 will return the inertia member 19 to its solid line position to cause the second metered quantity of fluid to be ejected from the cutting blade outlet orifice or orifices.

To change the quantity of fluid injected after each stroke, it is only necessary to adjust the screw 41 thereby adjusting the stop of the inertia member relative to the pump block 21. In other words, the stroke of the plunger 26 is adjustable by means of the adjustable screw 41 so that the plunger 26 is only returned to a given point depending upon the engagement of the screw 41 with the block 21.

In each instance after the fluid has been injected into the tree, the return to normal pressure in the passage outlet line 36 will permit the spring 40 to return the piston 39 to its downward position, as viewed in FIGURE 2, to close off the outlet orifices. This closing off of the orifices will prevent any undue dripping of toxicants or other chemicals from the outlet orifices as the hatchet is removed and moved preparatory to making a new cut.

By designing the head structure 10 with the open top channel as defined by the walls 16 and 17, access is had to the inertia member 19 so that the operator may pump the hatchet manually by simply pressing down on the inertia member 19 from above and releasing it. This operation is desirable initially to "prime" the pump and insure that there is fluid in the inlet hose line 14 and outlet hose 35 preparatory to effecting an injection.

From the foregoing description, it will thus be evident that the present invention has provided a greatly improved injection device which, being designed in the form of a hatchet, may be used with one hand. The provision of a separate reservoir as described in FIGURE 1 will provide a desired quantity of readily available chemical fluid for a considerable number of trees to be treated before requiring refilling of the reservoir. Further, since the reservoir is not incorporated directly in the hatchet structure, the hatchet itself has the advantage of light weight and compactness.

It will be clear, accordingly, that the various objectives set forth heretofore have been fully realized by the structure as described. While only one particular embodiment of the hatchet has been set forth in detail, various modifications and changes may be made without departing from the scope and spirit of the invention. For example, the handle 13 may be pivotally mounted to the hatchet head structure 10 so that if desired it may be swung approximately 90° so that the blade is in line with the handle for straight injection strokes. In addition, the inertia mechanism and pump means incorporated in the head may be designed for easy removal through the open top of the channel 18 for servicing in the field without the need of special tools.

The injection hatchet, accordingly, is not to be thought of as limited to the one embodiment set forth merely for illustrative purposes.

What is claimed is:

1. An injection hatchet including, in combination: a cutting blade having an outlet orifice; a source of fluid; pump means mounted in said hatchet and connected between said source of fluid and said outlet orifice for passing fluid to said outlet orifice when actuated; inertia means mounted in said hatchet and coupled to said pump means for causing fluid to be drawn into said pump means from said source upon impact of said hatchet with a tree; and pump actuating means responsive to movement of said inertia means to cause said fluid to be expelled by said pump means to said outlet orifice only after said inertia means has operated to draw fluid into said pump means whereby injection of said fluid into said tree can only take place after said hatchet has been imbedded in said tree.

2. An injection hatchet according to claim 1, in which said pump means includes a cylinder having a plunger slidable therein between first and second positions, movement of said plunger from said first to said second position drawing said fluid into said cylinder from said source and moving of said plunger from said second to said first position expelling said fluid from said cylinder to said outlet orifice, said inertia means being coupled to said plunger to move it from said first to said second position in response to said impact of said hatchet, said pump actuating means comprising a spring biasing said inertia means in a direction to move said plunger back to said first position.

3. An injection hatchet comprising, in combination: a head structure having a cutting edge and including a fluid outlet orifice adjacent to said cutting edge; a handle connected to said head structure; a fluid inlet hose passing to said head structure; a cylinder incorporated in said head structure and having a fluid inlet port passing into said cylinder at one side and a fluid outlet port passing from one end of said cylinder, said inlet hose communicating with said inlet port and said outlet orifice communicating with said outlet port; a plunger slidably mounted in said cylinder for movement between first and second positions towards and away from said outlet port, said plunger eclipsing said inlet portion said first position and exposing said inlet port in said second position; a check valve means connected between said outlet port and said outlet orifice to pass fluid from said cylinder to said outlet orifice and block the flow of fluid in a reverse direction; an inertia operated member movably mounted in said head and coupled to said plunger for moving said plunger from said first to said second position upon impact of said cutting edge with a tree; and biasing means in said head structure normally urging said inertia member in a direction to move said plunger from said second position to said first position whereby swinging said hatchet to imbed said cutting edge in a tree and move said plunger from said first to said second position draws fluid into said cylinder, said biasing means thereafter moving said plunger back to its first position to expel said fluid through said outlet port, check valve means, and orifice into said tree so that said fluid can only be injected in said tree after said cutting edge has been imbedded therein.

4. An injection hatchet according to claim 3, including a portable fluid reservoir adapted to be carried by a person using said hatchet, said fluid inlet hose passing axially through said handle and adapted to be sealingly connected to said fluid reservoir.

5. An injection hatchet according to claim 3, including a pressure equalizer connected between said inlet port and said inlet hose, said pressure equalizer defining a variable volume chamber for accommodating surges in pressure to insure a uniform flow of fluid into said cylinder when said inlet port is exposed.

6. An injection hatchet according to claim 3, including an additional check valve means connected between said first mentioned check valve means and said orifice, in a position adjacent to said orifice, said additional check valve means opening only in response to the increased pressure of the fluid passed to said orifice when the fluid is to be expelled, said additional check valve means otherwise being normally closed to prevent dripping and the like of fluid from said orifice when said hatchet is not being used.

7. An injection hatchet according to claim 3, in which said inertia member is pivoted for swinging movement in said head structure between first and second positions to move said plunger between its first and second positions; and an adjustment means for changing said first position of said inertia member to thereby enable adjustment of the stroke of said plunger in said cylinder so that the quantity of said fluid expelled by said plunger is adjustable.

8. An injection hatchet according to claim 7, in which said head structure is defined in part by a pair of parallel walls defining an open top channel within which said cylinder, plunger, and inertia member are mounted in exposed condition as viewed from the top of said channel so that access is provided to said inertia member and it may be moved between its first and second positions manually.

9. An injection hatchet including, in combination: a cutting blade having an outlet orifice; a source of fluid; pump means carried by said hatchet and connected between said source of fluid and said outlet orifice for passing fluid to said outlet orifice when actuated, fluid being drawn into said pump means from said source as a result of movement of a portion of said pump means by inertia upon impact of said hatchet with a tree; and pump actuating means coupled to said pump means and responsive to completion of impact of said hatchet with said tree to cause fluid to be expelled by said pump means to said outlet orifice only after fluid has been drawn into said pump means, whereby injection of said fluid into said tree can only take place after said hatchet has been imbedded in said tree.

References Cited by the Examiner

UNITED STATES PATENTS 2,846,817 8/1958 Haislet _____ 47—57.5
2,853,833 9/1958 Hash _____ 47—57.5

ABRAHAM G. STONE, *Primary Examiner.*

R. E. BAGWILL, *Assistant Examiner.*